United States Patent
Gao et al.

(10) Patent No.: US 8,601,120 B2
(45) Date of Patent: Dec. 3, 2013

(54) UPDATE NOTIFICATION METHOD AND SYSTEM

(75) Inventors: Zhi Gao, Beijing (CN); Xiaochuan Wang, Beijing (CN)

(73) Assignee: Beijing Sogou Technology Development Co., Ltd., Beijing (CN)

( * ) Notice: Subject to any disclaimer, the term of this patent is extended or adjusted under 35 U.S.C. 154(b) by 66 days.

(21) Appl. No.: 13/300,654

(22) Filed: Nov. 20, 2011

(65) Prior Publication Data

US 2012/0066380 A1 Mar. 15, 2012

Related U.S. Application Data

(63) Continuation of application No. PCT/CN2010/074242, filed on Jun. 22, 2010.

(51) Int. Cl.
*G06F 15/173* (2006.01)

(52) U.S. Cl.
USPC ................................. 709/224; 715/203

(58) Field of Classification Search
USPC .......................................... 709/224; 715/203
See application file for complete search history.

(56) References Cited

U.S. PATENT DOCUMENTS

| | | | | |
|---|---|---|---|---|
| 5,860,012 A * | 1/1999 | Luu | | 717/175 |
| 6,366,933 B1 * | 4/2002 | Ball et al. | | 715/203 |
| 7,085,807 B2 * | 8/2006 | Simpson et al. | | 709/203 |
| 2003/0233431 A1 * | 12/2003 | Reddy et al. | | 709/221 |
| 2004/0059813 A1 * | 3/2004 | Bolder et al. | | 709/224 |
| 2004/0075680 A1 * | 4/2004 | Grace et al. | | 345/734 |
| 2005/0262231 A1 * | 11/2005 | Lowe et al. | | 709/223 |
| 2008/0077848 A1 * | 3/2008 | Roberts | | 715/229 |
| 2011/0113359 A1 * | 5/2011 | Massey et al. | | 715/771 |
| 2011/0238855 A1 * | 9/2011 | Korsunsky et al. | | 709/231 |

* cited by examiner

*Primary Examiner* — Thomas Dailey
(74) *Attorney, Agent, or Firm* — Anova Law Group, PLLC

(57) ABSTRACT

An update notification method is provided. The method includes taking snapshots of a network resource and capturing specific contents of the network resource. The method also includes comparing specific contents of two consecutive snapshots of the network resource and, if there is a change in the specific contents of the network resource, notifying a user that contents of the network resource have been updated.

28 Claims, 11 Drawing Sheets

UPDATE NOTIFICATION METHOD AND SYSTEM

CROSS-REFERENCES TO RELATED APPLICATIONS

This application claims the priority of PCT patent application no. PCT/CN2010/074242, filed on Jun. 22, 2010, which claims the priority of Chinese patent application no. 200910087505.5, filed on Jun. 23, 2009, the entire contents of all of which are incorporated herein by reference.

FIELD OF THE INVENTION

The present invention relates to the field of Internet technologies and, more particularly, to an update notification method and system.

BACKGROUND

With the popularity of the Internet, people are more and more used to obtaining information and searching documents through the Internet. Although there are a huge variety of portal websites becoming operational, it is rather time consuming to switch back and forth between various websites. The search engines may help us to search for anything we want, however, it is burdensome to perform proper searches. Now there is a new information format on the Internet, which is called RSS (Rich Site Summary or Really Simple Syndication). The RSS is an XML-format standard for users to share news headlines and other Web contents, and is also a widely-used content packaging and delivery protocol on the Internet. Using RSS syndicate software tools, Internet users can read contents from websites supporting the RSS output at the client side.

FIG. 1A shows the implementation of existing RSS technology. As shown in FIG. 1A, based on user data and content data, an RSS server generates RSS files (commonly known as RSS Feed, i.e., the feed files or summary files) and sends the RSS files to the client side. The RSS reader at the client side displays to the user the contents of the received RSS files. Using RSS technology, people can subscribe to news and can also subscribe to Blog (commonly known as blog, short for Web Log) and so on. People only need to subscribe the desired contents in an RSS reader, and the contents will automatically appear in the Reader. Further, people do not need to constantly refresh web pages when there is a pressing need to know the news, because once there is any update, the RSS reader will make a corresponding reminder.

FIG. 1B is an RSS reader system structural diagram. As shown in FIG. 1B, for any page that supports RSS feeds, the page can be stored in the RSS database through the RSS subscription feature of the page, and RSS files can be obtained by regular or irregular data acquisitions.

Here, using the RSS2.0 format as an example, the syntax of an RSS file is briefly described below:

```
<channel>
    <title>Read/WriteWeb</title>
    <link>http://www.readwriteweb.com</link>
    <description>WebTechnology news,reviews and analysis</description>
    <lastBuildDate>Mon,02 Apr 2007 15:23:00-0800</lastBuildData>
    <item>
        <title>Morfik Patents AJAX Compiler</title>
        <description> Morfik Patents AJAX Compiler ...</description>
        <link>http://www.readwriteweb.com/...</link>
```

-continued

```
        <category>News</category>
        <pubDate>Mon,02 Apr 2007 15:23:00-0800</pubDate >
        <author>Richard MacManus</author>
    </item>
    ......
</channel>
```

Each RSS file is included in a channel tag. Each item has a title tag, a link tag, and description (or attribute) tag. Updates to the RSS are determined by two time stamps. One is the lastBuildDate tag in the channel, which reflects the time of the last change in the RSS contents; and the other is the pubDate tag in the channel, which reflects the time of the publication of the contents. The RSS reader uses both time stamps to determine when new contents exist.

However, to the best knowledge of the applicants, the existing technologies only applicable to web pages supporting the RSS output (such as blog, news, etc.) for providing Internet users with collection (or subscription) functions and, when the web pages collected or subscribed have updates, reminding the users such that the users can timely browse updated contents. However, for web pages that do not support the RSS output (such as Putting-it), the existing technologies may be inapplicable.

The disclosed methods and systems are directed to solve one or more problems set forth above and other problems.

BRIEF SUMMARY OF THE DISCLOSURE

One aspect of the present disclosure includes an update notification method. The method includes taking snapshots of a network resource and capturing specific contents of the network resource. The method also includes comparing specific contents of two consecutive snapshots of the network resource and, if there is a change in the specific contents of the network resource, notifying a user that contents of the network resource have been updated.

Another aspect of the present disclosure includes an update notification system. The update notification includes an update detection module and a user interface module. The update detection module includes a snapshot unit, a capturing unit, and a comparison and analysis unit. The snapshot unit is configured to take snapshots of a network resource; the capturing unit is configured to capture specific contents of the network resource; and the comparison and analysis unit is configured to compares specific contents of two consecutive snapshots of the network resource. Further, the user interface module includes a notification unit. The notification unit is configured to notify a user of a change in contents of the network resource when the update detection module detects the change in the specific contents of the network resource.

Other aspects of the present disclosure can be understood by those skilled in the art in light of the description, the claims, and the drawings of the present disclosure.

DETAILED DESCRIPTION

Figure 1A:
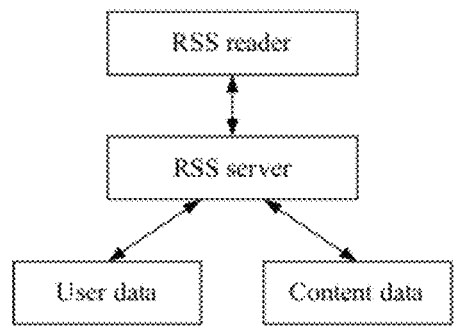
FIG. 1A is an implementation diagram of existing RSS technology.
Figure 1B:
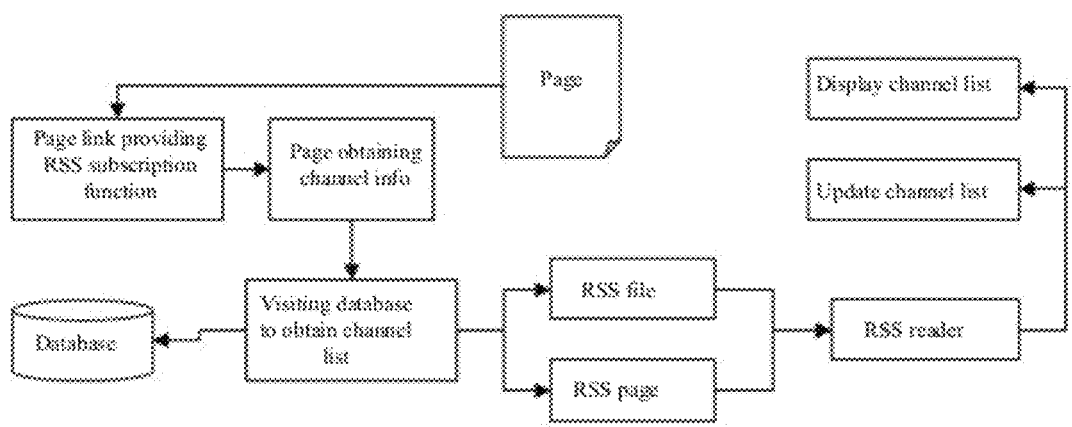
FIG. 1B is an RSS reader system structural diagram.

Reference will now be made in detail to exemplary embodiments of the invention, which are illustrated in the accompanying drawings. For convenient purposes, certain terms used in this disclosure are explained first.

The term "URL," or Universal Resource Locator, is a representation of a network resource. Certain other identifiers may also be used.

The term "HTML," or HyperText Markup Language, is currently the most widely used language on the Internet, and is also a main language for webpage documents. Certain other languages may also be used in place of HTML.

The term "DOM," Document Object Model, refers a browser, platform, and language-neutral interface that can be used to access other standard components of web pages. Certain other interfaces may also be used.

The term "network resource," as used herein, refer to any resource that can be identified and analyzed by a browser and its plug-ins, such as web pages, videos, audios, and pictures, etc.

The term "specific content," as used herein, refer to any information in a network resource interested by a user. Specific content may include part or all of the information in the network resource. It is understood that, because of the ever-changing forms of network resources, the standard for the specific content(s) may be flexible. As long as interested by the user, any content can be considered as the specific content of a network resource. For example, if a user is interested in an advertisement at a certain location of a certain network resource, such advertisement can also be considered as the specific content of the certain network resource, while, in general, HTML tag sets and large amount of advertisements and navigation information in network resources are considered as non-specific contents.

A "specific element" may refer any element of a network resource or a collection of multiple elements, and the multiple elements may be presented in different forms, e.g., in a discrete form or in a contiguous form.

A "specific area" may refer any area of the network resource or multiple areas of the network resource.

The specific area and the specific element are two ways to extract or capture specific contents. That is, by obtaining specific areas of the network resource, the contents of the specific areas can be obtained as the specific contents of the network resource; or by obtaining specific elements of the network resource, the contents of the corresponding specific elements can be obtained as the specific contents of the network resource. When a specific area is a single area in the network resource and the area is small enough as only fitting one element, the specific area is equivalent to a specific element in the network resource. On the other hand, when a specific element is a collection of multiple elements contiguously formed together into an area, the specific element is equivalent to a specific area.

Further, a "subpage" of a webpage may refer to any child or subsequent page that may be accessed from the webpage. A subpage area may refer to an area of a webpage describing the subpage information of a current page, and the subpage information includes the current page, the total number of pages, links or buttons for jumping to other pages, etc. Also, a subpage property is part of the information contained in the subpage information, i.e., the dynamically changing information, and includes the current page, last-visited page, and the total number of pages, etc.

A webpage attribute database may refer to any appropriate type database for storing webpage attribute information. The webpage attribute database may include a webpage attribute database at the client side and a webpage attribute database at the server side.

A dynamic collection may refer to a collection of links to network resources, such as a favorites folder in a browser, that can be updated dynamically, and a dynamic collection database may be used to store any appropriate information related to the dynamic collection.

Figure 2A:
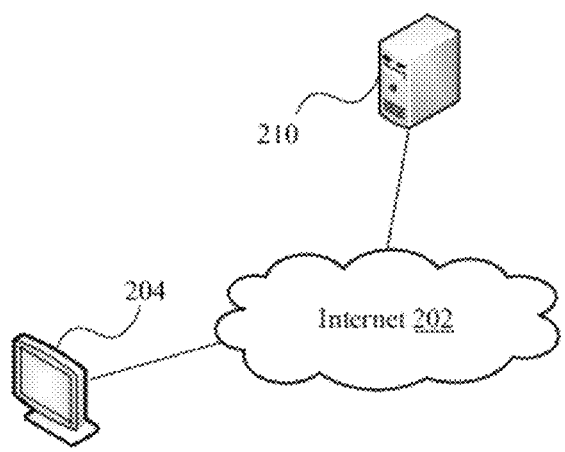
FIG. 2A illustrates an exemplary network environment incorporating certain aspects of the disclosed embodiments.

FIG. 2A illustrates an exemplary network environment incorporating certain aspects of the disclosed embodiments. As shown in FIG. 2A, network environment 200 may include the Internet 202, a user computer 204, and a server 210. Other components may be added and certain devices may be removed without departing from the principles of the disclosed embodiments.

The Internet 202 may include any private and public computer networks interconnected using the standard transport control protocol/internet protocol (TCP/IP). Internet 202 may connect a large number of network resources.

Figure 2B:
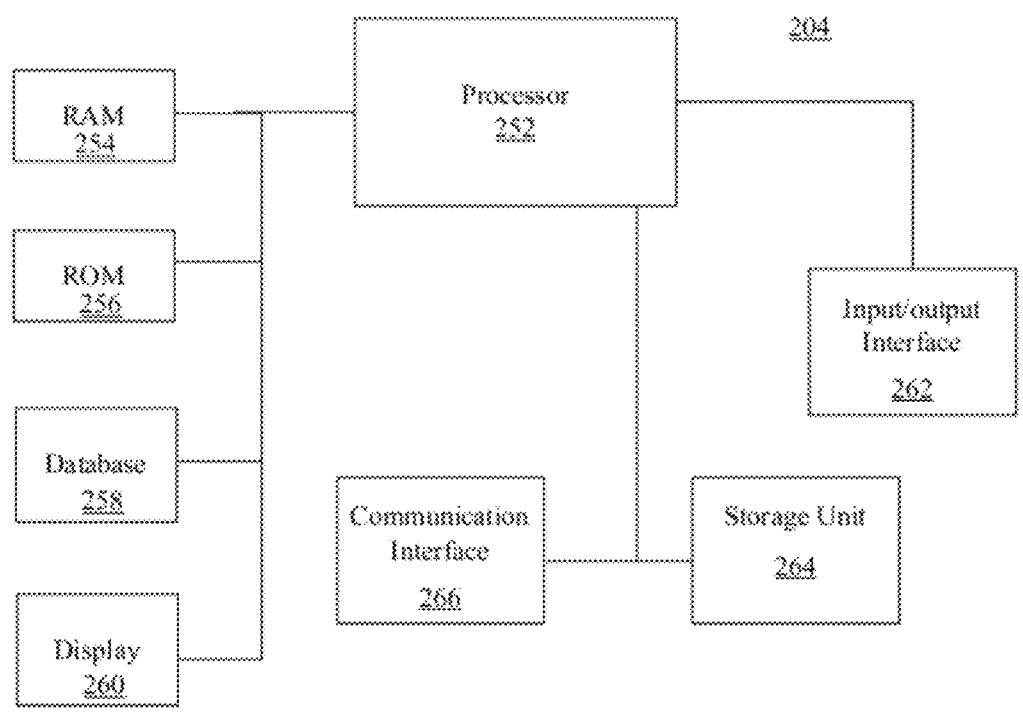
FIG. 2B illustrates a block diagram of an exemplary user computer consistent with the disclosed embodiments.

Server 210 may include any appropriate computer servers, software, and databases so as to provide various websites and web pages. Further, user computer 204 may include any appropriate types of computers operated by a user or users to access web-based or local network resources. For example, user computer 204 may include a desktop computer, a notebook computer, a tablet, a smart phone, and other types of computing platforms and software programs. FIG. 2B shows a block diagram of an exemplary user computer 204.

As shown in FIG. 2B, user computer 204 may include a processor 252, a random access memory (RAM) unit 254, a read-only memory (ROM) unit 256, a database 258, a display 260, an input/output interface unit 262, a storage unit 264, and a communication interface 266. Other components may be added and certain devices may be removed without departing from the principles of the disclosed embodiments.

Processor 252 may include any appropriate type of graphic processing unit (GPU), general-purpose microprocessor, digital signal processor (DSP) or microcontroller, and application specific integrated circuit (ASIC), etc. Processor 252 may execute sequences of computer program instructions to perform various processes associated with user computer 204. The computer program instructions may be loaded into RAM 254 for execution by processor 252 from read-only memory 256.

Database 258 may include any appropriate commercial or customized database to be used by user computer 204, and may also include query tools and other management software for managing database 258. Display 260 may include any appropriate computer monitor, such as an LCD monitor. Further, input/output interface 262 may be provided for a user or users to input information into user computer 204 or for the user or users to receive information from user computer 204. For example, input/output interface 262 may include any appropriate input device, such as a remote control, a keyboard, a mouse, a microphone, a video camera or web-cam, an electronic tablet, voice communication devices, or any other optical or wireless input devices. Input/output interface 262 may include any appropriate output device, such as a speaker, or any other output devices.

Storage unit 264 may include any appropriate storage device to store information used by user computer 204, such as a hard disk, a flash disk, an optical disk, a CR-ROM drive, a DVD or other type of mass storage media, or a network storage. Further, communication interface 266 may provide communication connections such that user computer 204 may be accessed remotely and/or communicate with other systems through computer networks or other communication networks via various communication protocols, such as TCP/IP, hyper text transfer protocol (HTTP), etc.

Figure 9:
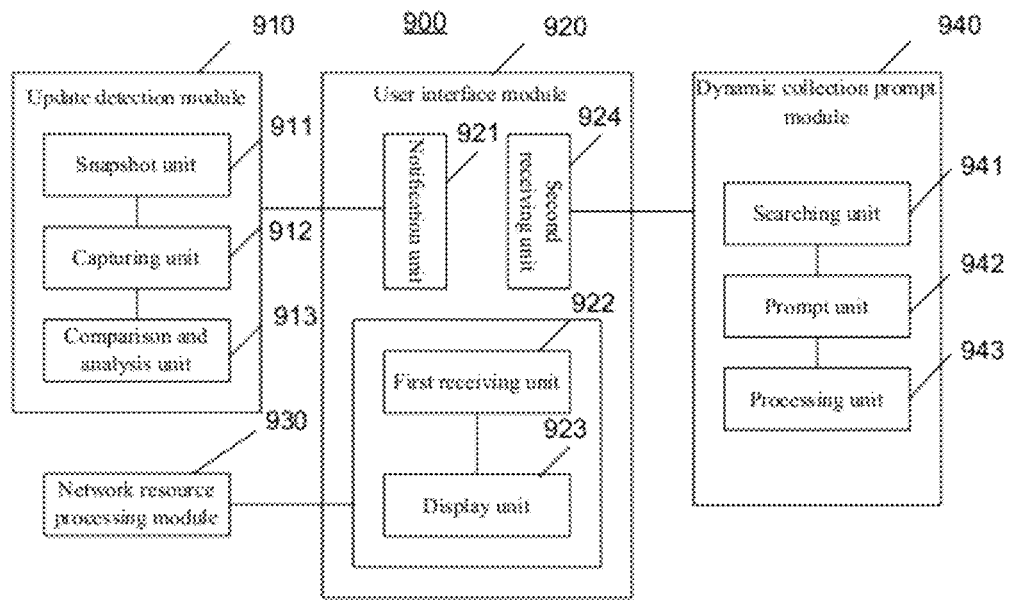
FIG. 9 illustrates an exemplary update notification system consistent with the disclosed embodiments.

Returning to FIG. 2A, user computer 204 may access various network resources from server 510 or other servers through Internet 502 or from local storages. A network resource update notification system may be implemented on user computer 204 to facilitate user or users to access network resources and to be notified actively and timely about any updates in the network resources interested by the user or user. FIG. 9 illustrates an exemplary block diagram of an update notification system 900.

Update notification system 900 may be implemented in hardware, software, or a combination of hardware and software. For example, update notification system 900 may be implemented as a part of a browser. Further, the system 900 may be independently implemented at the client side (such as browsers), independently implemented at the server side, or implemented partly at the client side and partly at the server side.

As shown in FIG. 9, system 900 may include an update detection module 910, a user interface module 920, a network resource processing module, and a dynamic collection prompt module 940. Certain module(s) may be omitted and other components may also be included.

Update detection module 910 may include a snapshot unit 911, a capturing unit 912, and a comparison and analysis unit 913. Snapshot unit 911 may be configured to take snapshots of network resources; capturing unit 912 may be configured to capture specific contents of the network resources; and comparison and analysis unit 913 may be configured to compare the specific contents of two consecutive snapshots of a same network resource.

The user interface module 920 may include a notification unit 921, a first receiving unit 922, a second receiving unit 924, and a display unit 923. If the update detection module 910 detects any change in the specific contents of the network resources, the notification unit 921 notifies the user of the change in the contents of the network resources.

The snapshot unit 911 may take snapshots of the network resource periodically with an updating time interval, or take snapshots of the network resource immediately according to a trigger by the user. Further, the comparison and analysis unit 913 compares the specific contents of two consecutive snapshots of the network resource based on the HTML source code of the network resource or the corresponding document object model of the network resource.

Figure 10:
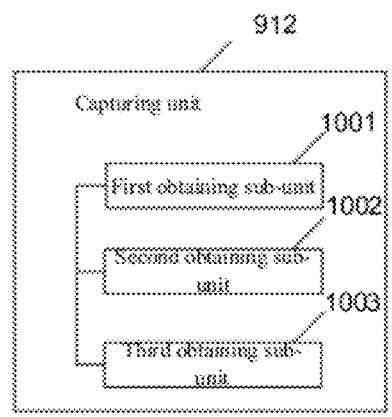
FIG. 10 illustrates an exemplary capturing unit consistent with the disclosed embodiments.

FIG. 10 shows an exemplary structural diagram of capturing unit 912 of the update notification system 912. The capturing unit 912 captures the specific contents by obtaining the specific areas of the network resources. As shown in FIG. 10, the capturing unit 912 further includes: a first obtaining sub-unit 1001, a second obtaining sub-unit 1002, and a third obtaining sub-unit 1002.

The first obtaining sub-unit 1001 is configured to obtain the specific areas of the network resources through the document object model of the network resources and to obtain and store the specific contents.

Further, the capturing unit 912 can also be used to obtain subpage areas of the network resources. The second obtaining sub-unit 1002 may be configured to search the subpage areas matching the URLs of the network resources in a database, to determine the subpage properties based on the subpage areas, and to capture and store the specific contents of all subpages of individual network resources.

The capturing unit 912 can also be used to obtain the specific contents through obtaining the specific elements of the network resources. The third obtaining sub-unit 1003 may be configured to obtain the specific elements of the network resources through the document object model of the network resources. For example, the third obtaining sub-unit 1003 may be configured to obtain coordinates of elements of the network resource as identified by a user; to mark the obtained coordinates in the document object model of the network resource; and to find the specific elements of the network resources through node information in the marked document object model.

Further, the specific elements of the network resources can also be analyzed automatically by the system, or the specific elements of the network resources can be searched based on the ID, name, or style of the elements of the network resource as specified by the user, and the specific contents may then be obtained and stored. It should be noted that corresponding matching relationships between the specific contents of the network resources and the URLs of the network resources as obtained by the capturing unit 912 can be stored in a dynamic collection database.

The first obtaining sub-unit 1001 may obtain the specific areas of the network resources through the document object model of the network resources in various ways. For example, the specific areas of network resources can be obtained through the specific-area determination method; or the specific areas of network resources can be obtained through a user-defined method. Further, the specific-area determination method and the user-defined method may be combined together, or the specific-area determination method, the user-defined method, and a database searching method may be combined together.

Figure 11:
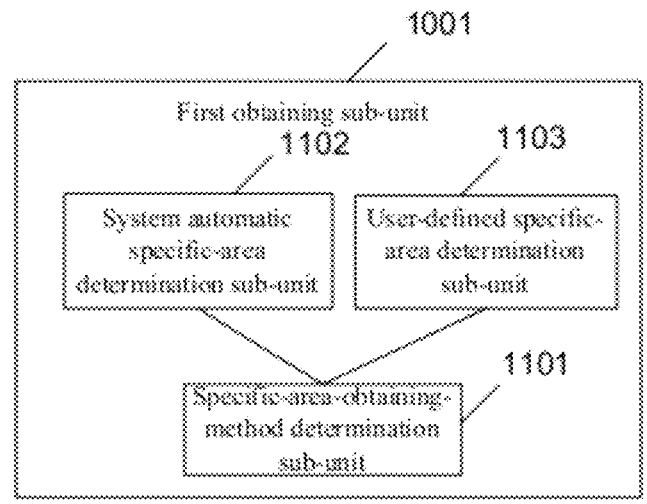
FIG. 11 illustrates an exemplary first obtaining sub-unit consistent with the disclosed embodiments.

FIG. 11 shows an exemplary structural diagram of the first obtaining sub-unit 1001 in the update notification system 900. As shown in FIG. 11, the first obtaining sub-unit 1001 may include a specific-area-obtaining-method determination sub-unit 1101, a system-automatic specific-area determination sub-unit 1102, and a user-defined specific-area determination sub-unit 1103.

The system-automatic specific-area determination sub-unit 1102 may be configured to obtain specific areas using system functions automatically. The user-defined specific-area determination sub-unit 1103 may be configured to obtain specific areas using a user-defined method. For example, the user-defined specific-area determination sub-unit 1103 may be configured to obtain coordinates of an area specified by the user, and to mark the coordinates in the document object model of the network resource. All marked nodes form a specific area matching the URL of the network resource.

The specific-area-obtaining-method determination sub-unit 1101 may be configured to determine whether there is a user-defined method. If there is a user-defined method, first obtaining sub-unit 1001 can be instructed to obtain the specific areas of the network resources through user-defined specific-area determination sub-unit 1103. If there is not a user-defined method, first obtaining sub-unit 1001 can be instructed to obtain the specific areas of the network resources through system automatic specific-area determination sub-unit 1102.

Alternatively or additionally, the specific-area-obtaining-method determination sub-unit 1101 may be used to determine whether there is a user-defined method. If there is a user-defined method, first obtaining sub-unit 1001 can be instructed to obtain the specific areas of the network resources through user-defined specific-area determination sub-unit 1103. If there is not a user-defined method, first obtaining sub-unit 1001 can be instructed to search the database to find the specific areas matching the URL of the network resources.

If the specific areas matching the URL of the network resources cannot be found, first obtaining sub-unit 1001 is instructed to obtain the specific areas of the network resources through system automatic specific-area determination sub-unit 1102. Further, after the specific areas of the network resources are obtained by user-defined specific-area determination sub-unit 1103 and system automatic specific-area determination sub-unit 1102, the first obtaining sub-unit 1001 can be used to store the matching relationship between the specific area of the network resource and the URL of the network resource.

In addition, after the first obtaining sub-unit 1001 obtains the specific areas of the network resources through user-defined specific-area determination sub-unit 1103, first obtaining sub-unit 1001 may store the matching relationship between the specific area of the network resource and the URL of the network resource in a user-defined database. After the first obtaining sub-unit 1001 obtains the specific areas of the network resources through system automatic specific-area determination sub-unit 1102, first obtaining sub-unit 1001 may store the matching relationship between the specific area of the network resource and the URL of the network resource in a webpage attribute database.

When the first obtaining sub-unit 1001 searches the database to find the specific areas matching the URL of the network resources, the first obtaining sub-unit 1001 may search the user-defined database to find the specific areas matching the URL of the network resources. If nothing is found, the first obtaining sub-unit 1001 may further search the webpage attribute database. More specifically, the webpage attribute database may include a webpage attribute database at the client side and a webpage attribute database at the server side. When searching, the first obtaining sub-unit 1001 may first search the webpage attribute database at the client side. If nothing is found, the first obtaining sub-unit 1001 may search the webpage attribute database at the server side.

Figure 12:
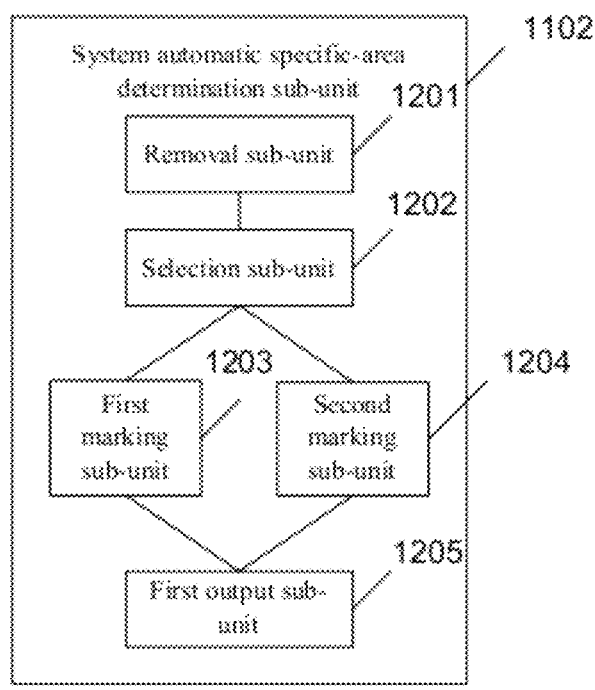
FIG. 12 illustrates an exemplary system automatic specific-area determination sub-unit consistent with the disclosed embodiments.

FIG. 12 shows an exemplary structural diagram of system-automatic specific-area determination sub-unit 1102. The system automatic specific-area determination sub-unit 1102 may be configured to determine the specific area of the network resource based on the area of the nodes and the number of similar nodes in the document object model of the network resource.

As shown in FIG. 12, system-automatic specific-area determination sub-unit 1102 may include a removal sub-unit 1201, a selection sub-unit 1202, a first marking sub-unit 1203, a second marking sub-unit 1204, and a first output sub-unit 1205. Among them, removal sub-unit 1201 may be optional, being used to set the root node of the document object model of the network resource as the current node, and to remove specified child nodes of the current node. The remaining child nodes of the current node form the selected child nodes.

The selection sub-unit 1202 sorts the selected child nodes based on the area of these child nodes, selects a child node with an area greater than a determined threshold, sets the child node with the area greater than or equal to the determined threshold as the current node, and continues to select other child nodes meeting the requirement.

The first marking sub-unit 1203 separate the selected child nodes into groups based on tags (e.g., tags in web page source code). If there is a group containing child nodes whose number is greater than two (2) and whose total area is greater than the determined threshold, all child nodes in that group is marked.

However, when the first marking sub-unit 1203 does not mark any nodes, the second marking sub-unit 1204 is started to traverse all child nodes according to the area of individual child nodes, from largest to smallest, and to accumulate the areas of the traversed child-nodes. When the accumulated areas of the traversed child-nodes are greater than a determined threshold, the second marking sub-unit 1204 marks all traversed child-nodes. The threshold may be set to a value of not less than 0.5 and preferably may be set to 0.6 or 0.75. Further, the first output sub-unit 1205 outputs all marked nodes as a specific area matching the URL of the network resource.

Figure 13:
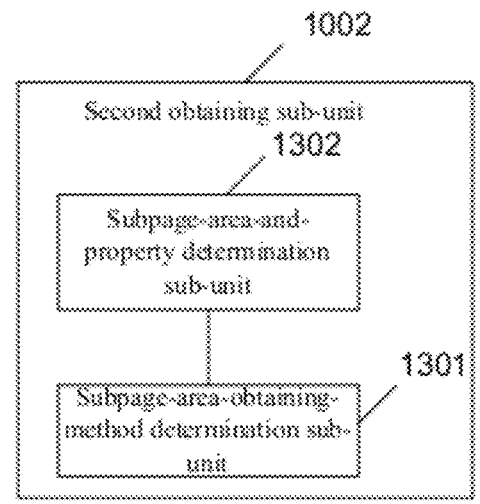
FIG. 13 illustrates an exemplary second obtaining sub-unit consistent with the disclosed embodiments.

Returning to FIG. 10, the second obtaining sub-unit 1002 may obtain the subpage area and property of the network resource through the document object model of the network resource in various ways. For example, the subpage area and property of the network resource can be obtained by searching the database, or the subpage area and property of the network resource can be obtained by a subpage area and property determination method. Further, the database searching method and the subpage area and property determination method may be combined. FIG. 13 shows an exemplary structural diagram of the second obtaining sub-unit 1002.

As shown in FIG. 13, the second obtaining sub-unit 1002 may include a subpage-area-obtaining-method determination sub-unit 1301, and a subpage-area-and-property determination sub-unit 1302. The subpage-area-obtaining-method determination sub-unit 1301 may instruct the second obtaining sub-unit 1002 to search a subpage area matching the URL of the network resource from the database.

If the subpage area matching the URL of the network resource cannot be found, sub-unit 1301 may instruct the second obtaining sub-unit 1002 to obtain the subpage area and property through the subpage-area-and-property determination sub-unit 1302 and to capture the specific contents of all subpages. Further, after obtaining the subpage area and property through the subpage-area-and-property determination sub-unit 1302, the second obtaining sub-unit 1002 can also be used to store in the database the matching relationship between the subpage area and the URL of the network resource, and the matching relationship between the subpage property and the URL of the network resource.

More specifically, the sub-unit 1002 may store the matching relationship between the subpage area and the URL of the network resource in the webpage attribute database, and store the matching relationship between the subpage property and the URL of the network resource in the dynamic collection database. Further, the subpage-area-and-property determination sub-unit 1302 traverses through the document object model of the network resource to search the subpage property nodes, marks all subpage property nodes found, obtains the subpage area matching the URL of the network resource, obtains the URL pointed by the last link child-node of the subpage property nodes, and obtains the subpage property matching the URL of the network resource.

Figure 14:
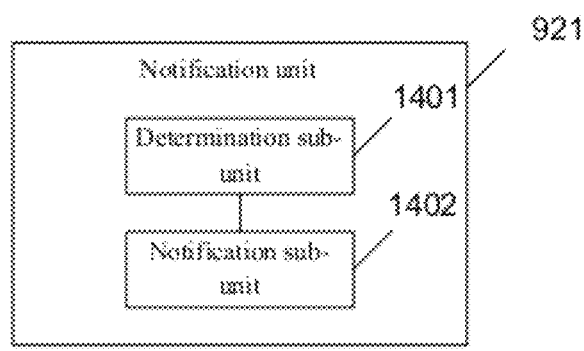
FIG. 14 illustrates an exemplary notification unit consistent with the disclosed embodiments.

FIG. 14 shows an exemplary structural diagram of the notification unit 921. As shown in FIG. 14, the notification unit 921 may include a determination sub-unit 1401 and a notification sub-unit 1402. The determination sub-unit 1401 may be configured to determine whether the change in the specific contents satisfies the user-defined notification rule, and the notification sub-unit 1402 may be configured to notify the user of changes in the contents of the network resources if the determination sub-unit 1401 provides a positive determination.

The user-defined notification rule may include one or more of the followings: the total number of changed words in the specific contents exceeds a certain threshold value, the changed portion in the specific contents contains picture(s) (picture changes), the changed portion in the specific contents contains link(s) (link changes), the changed portion in the specific contents contains key word(s), and/or the changed portion in the specific contents contains multi-media file(s).

Returning to FIG. 9, the user interface module 920 may further include: a first receiving unit 922 and a display unit 923. More particularly, the first receiving unit 922 receives an instruction from the user to read the network resource, and triggers the network resource processing module 930 to highlight the changed portion of the specific contents of the network resource based on results of the comparison and analysis. The processed network resource is then displayed to the user through the display unit 923.

Further, the dynamic collection prompt module 940 may include a searching unit 941, a prompt unit 942, and a processing unit 943. Further, the user interface module 920 also includes a second receiving unit 924 configured to receive an instruction from the user to add network resources to the collection and to trigger the dynamic collection prompt module 940.

More specifically, the searching unit 941 in the dynamic collection prompt module 940 is configured to search the URL weight matching the network resource. If the searching unit 941 finds the URL weight matching the network resource, the prompt unit 942 is used to provide the user with dynamic collection prompt based on the search results. Further, the processing unit 943 is configured to determine whether to set the URL of the network resource as the link to the specified network resource based on the user's response to the dynamic collection prompt.

Figure 3:
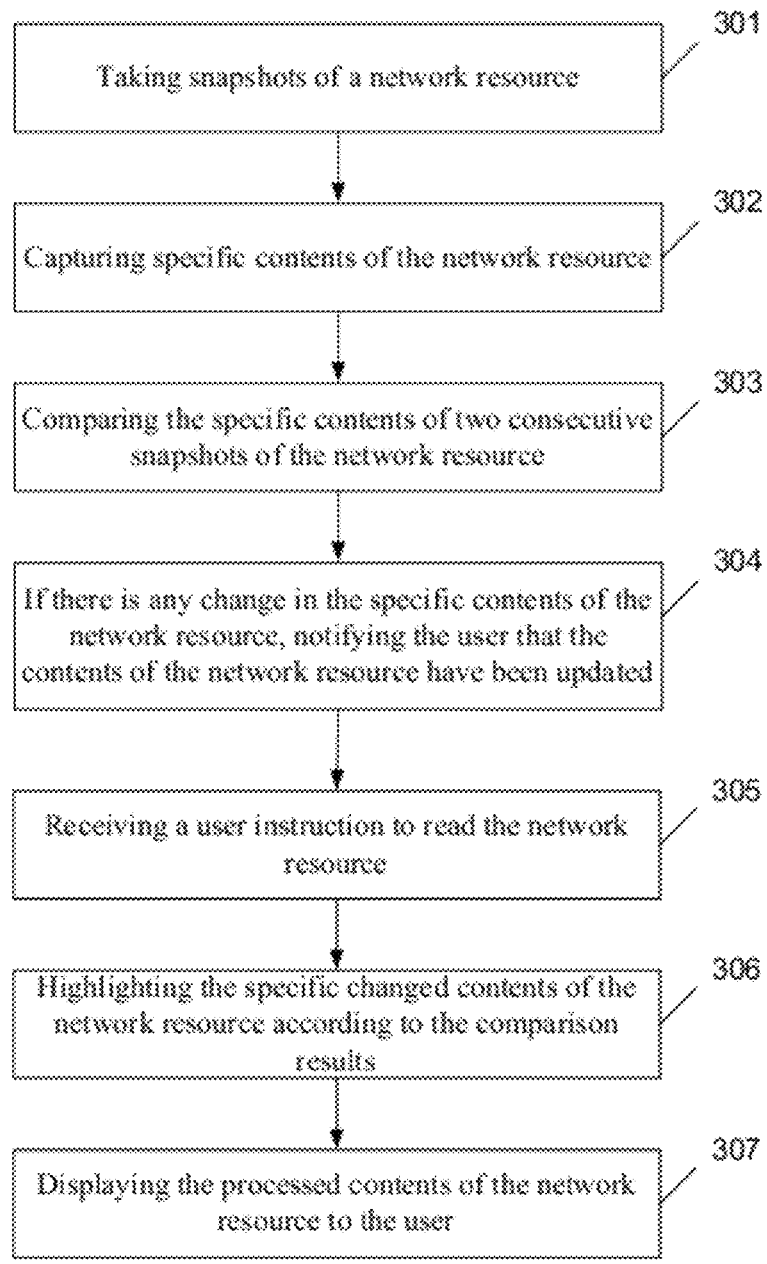
FIG. 3 illustrates an exemplary update notification operational process consistent with the disclosed embodiments.

Returning to FIG. 9, in operation, update notification system 900 (e.g., various modules, units, and sub-units described above) may perform certain operational processes to dynamically monitor network resource changes and notify the user in various ways. FIG. 3 shows an exemplary system operational process consistent with the disclosed embodiments. As shown in FIG. 3, at beginning, the update notification system 900 may take snapshots of a network resource (301). Consecutive snapshots of the network resource may be taken periodically using an updating time interval, or may be taken immediately upon a trigger by a user.

Further, the updating time interval may be set uniformly within the system for all specified network resources, or may be set separately within the system based on attributes of individual network resources. Further, the configured matching relationships between URL (Universal Resource Locator) of the network resource and the updating time interval of the network resource may be pre-stored for subsequent queries.

After taking snapshots of a network resource (301), the system 900 may capture specific contents of the network resource (302). In implementation, document object model or other models with similar features based on HTML source code of the network resource, or the HTML source code directly, can be used to capture specific contents of the network resources. Further, various ways may be used to capture the specific contents of the network resource. For example, the specific contents may be captured through specific areas of the network resource, or may be captured through specific elements of the network resources More specifically, obtaining the specific areas through the document object model may be realized in various ways. The specific areas of network resources can be obtained through a specific-area determination method, or can be obtained through a user-defined method. Further, it may be determined whether there is a user-defined method to obtain the specific area. If there is a user-defined method, the specific area of the network resource is obtained using the user-defined method; if there is no user-defined method, the specific area of the network resource is then obtained through the specific-area determination method.

Alternatively or additionally, the system 900 may first determined whether there is a user-defined method to obtain the specific area. If there is a user-defined method, the specific area of the network resource is obtained using the user-defined method; if there is no user-defined method, a database may be searched to find a specific area matching the URL of the network resource. If a specific area matching the URL of the network resource cannot be found, the specific area of the network resources is then obtained through the specific-area determination method.

Further, after the specific area of the network resource is obtained through the user-defined method and the specific-area determination method, the matching relationship between the URL of the network resource and the specific area of network resource can be stored in the database. For example (using a webpage as example), after the specific area of the webpage is obtained using the user-defined method, the matching relationship between the URL of the webpage and the specific area of the webpage may be stored in a user-defined database; or after the specific area of the webpage is obtained using the specific-area determination method, the matching relationship between the URL of the webpage and the specific area of the webpage may be stored in a webpage attribute database.

When the databases are searched to find a specific area matching the URL of the webpage, the user-defined database may be searched to find the specific area matching the URL of the webpage. If the specific area cannot be found, the webpage attribute database may be searched. Further, the webpage attribute database can be separated into a client-side webpage attribute database and a server webpage attribute database. During searching, the client-side webpage attribute database may be searched first. If nothing is found in the client-side webpage attribute database, the server webpage attribute database can then be searched.

In addition, currently a large amount of valuable information is provided in forums, such as Baidu Putting-it, Baidu Knows, major professional photography forums, and parenting forums, etc. If the user collects network resources carrying such information, at the same time when the specific areas of the network resources are obtained, an automatic detection feature may also be provided for detecting the latest network resources.

Figure 4:
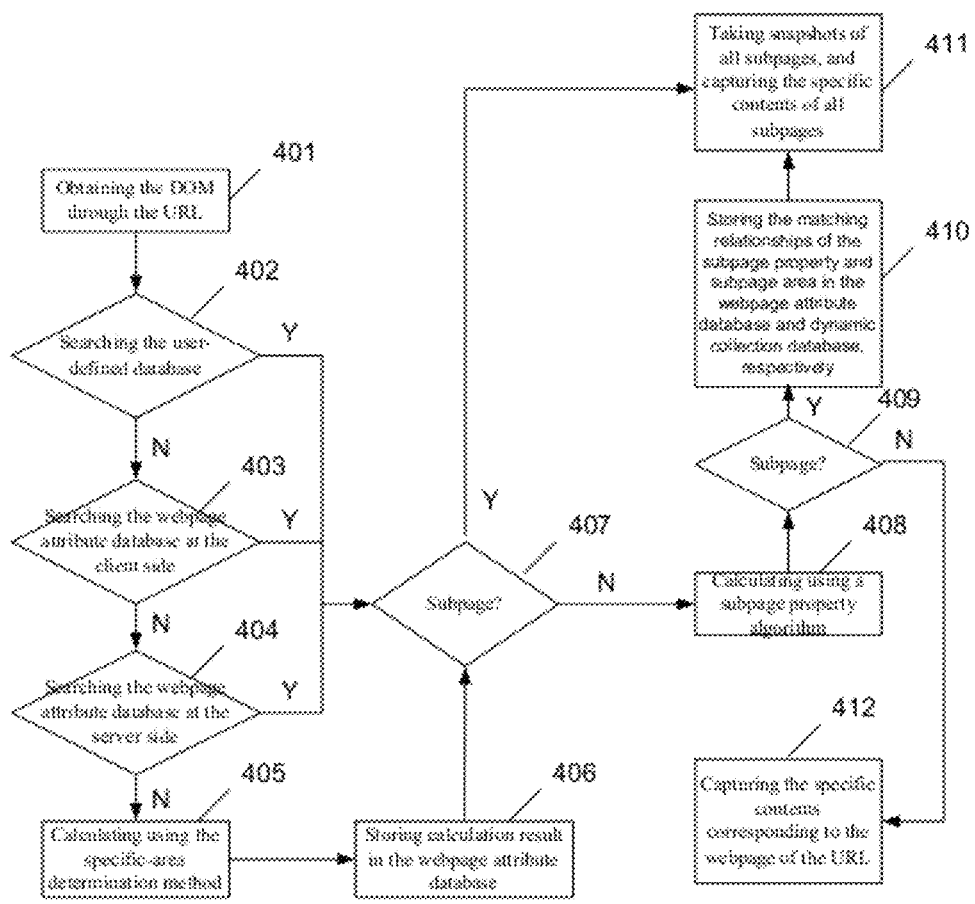
FIG. 4 illustrates an exemplary specific area operational process consistent with the disclosed embodiments.

That is, all updated network resources since the user last time read any network resources are preserved and further prompted and displayed to the user when the user opens the browser next time. FIG. 4 shows an exemplary process for obtaining webpage specific areas, subpage areas, and subpage properties. It should be noted that a subpage area refers to an area describing the subpage information of a current page, and the subpage information includes the current page, the total number of pages, links or buttons for jumping to other pages, etc. The subpage property is part of the information contained in the subpage information, i.e., the dynamically changing information, and includes the current page, last-visited page, and the total number of pages, etc. The process uses the URL of a webpage as an input, the specifics of which is as follows:

As shown in FIG. 4, the system 900 may obtain the corresponding document object model through the URL of the webpage (S401), and search the user-defined database to find a specific area matching the URL of the webpage (S402). If the searching is not successful, the process continues from S403; otherwise the process goes to S407.

The system 900 may also search the webpage attribute database at the client side to find a specific area matching the URL of the webpage (S403). If the searching is not successful, the process continues to S404; otherwise, preferably, simultaneously searching a subpage area matching the URL of the webpage and the process goes to S407 if the searching is successful.

Further, the system 900 may search the webpage attribute database at the server side to find a specific area matching the URL of the webpage (S404). If the searching is not successful, the process continues to S405; otherwise, preferably, simultaneously searching a subpage area matching the URL of the webpage and the process goes to S407 if the searching is successful. It is obvious that searching the subpage area may be a preferred implementation. However, in other embodiments, such step may be omitted.

The system 900 may calculate the specific area corresponding to the URL of the webpage using the specific-area determination method (S405). Further, the system 900 may also store the matching relationship between the calculated specific area and the URL of the webpage in the webpage attribute database at the client side (S406).

In S407, the system 900 may determine whether there is any subpage in the subpage area. If there is any subpage in the subpage area, the process goes to S411; otherwise the process continues to S408.

The system 900 may calculate the subpage area and subpage property through a subpage property algorithm (S408), and may determine whether there is any subpage based on the calculated subpage property (S409). If there is any subpages, the process goes to S410; otherwise the process continues to S412.

In S410, system 900 may store the matching relationship between the subpage area and the URL of the webpage in the webpage attribute database at the client side, and storing the matching relationship between the subpage property and the URL of the webpage in a dynamic collection database. Further, system 900 may take snapshots of all subpages in the dynamic collection database since the user read any page last time, and capturing the specific contents of all subpages (S411). In S412, system 900 may capture the specific contents corresponding to the webpage of the URL.

Figure 5:
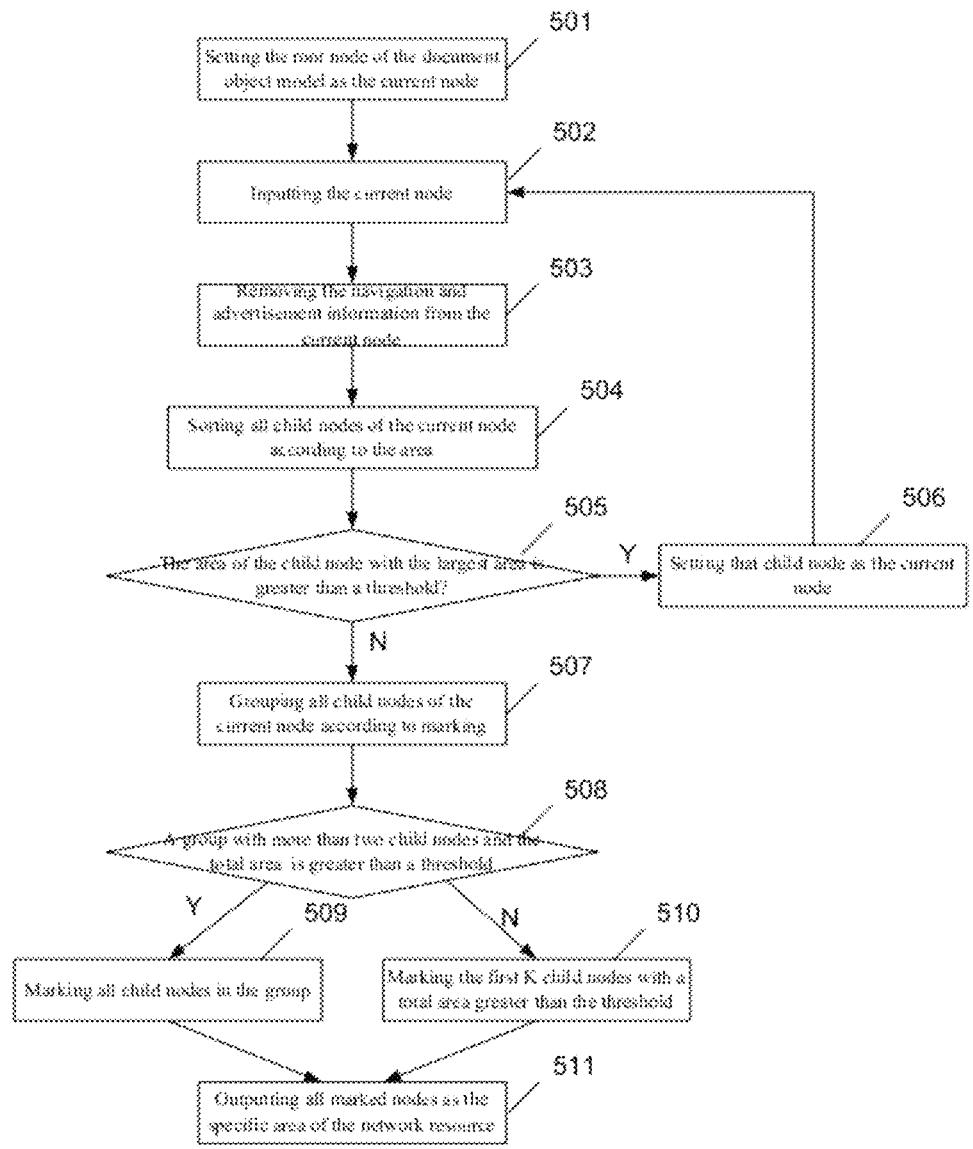
FIG. 5 illustrates another exemplary specific area operational process consistent with the disclosed embodiments.

The specific-area determination method may determine the specific area of the network resource based on the area of the nodes in the document object model and the number of similar nodes. FIG. 5 shows an exemplary process for a specific-area determination method using document object model corresponding to the URL of the webpage as input.

As shown in FIG. 5, the system 900 may set the root node of the document object model as the current node (S501), and input the current node (S502). Optionally, system 900 may remove the navigation and advertisement information from the current node (S503). Usually, navigation and advertisement information is considered as non-specific content, thus this type of information may removed.

Further, system 900 may sort all child nodes of the current node according to the area (S504), and determine whether the area of the child node with the largest area is greater than a threshold (S505). The threshold may be set to a value at least not less than 0.5. If the area is greater than the threshold, the process continues to S506; otherwise the process goes to S507.

In S506, system 900 may set that child node as the current node, and the process goes to S502. In S507, system 900 may group all child nodes of the current node according to marking.

Further, system 900 may determine whether there is a group with more than two child nodes and the total area of all child nodes in the group is greater than a threshold of at least not less than 0.5 (S508). If this condition is satisfied, the process continues to S509; otherwise the process goes to S510. In S509, system 900 may mark all child nodes in the group, and in S510, system 900 may mark the first K child nodes with a total area greater than the threshold. System 900 may also output all marked nodes as the specific area matching the URL of the webpage (S511).

It should be noted that the threshold in the above process is not less than 0.5, and preferably be 0.75 or 0.6. Other values may also be used.

In addition to obtaining the specific contents by obtaining the specific area of the network resource, the specific contents can also be obtained by obtaining the specific elements of the network resource. Further, obtaining the specific elements can also be realized in various ways.

For example, the specific elements may be obtained through the document object model of the network resource. More specifically, obtaining the specific elements of the network resource through the document object model may include: obtaining coordinates of elements of the network resource as identified by the user; marking the obtained coordinates in the document object model of the network resource; and finding the specific elements of the network resources through node information in the marked document object model.

Further, the specific elements can also be searched based on the ID, name, or style of the elements of the network resource as specified by the user. More particularly, the ID, name, or style (e.g., bold font, color, etc.) of a specific element is first obtained using a system function, and the specific element and other attributes, such as text, size, width, and height, etc. (not all specific elements have such attribute information, and even when a specific element has multiple attributes, only the attributes interested by the user need to be obtained), can be obtained based on the ID, name, or style of the specific element. Further, the ID and attribute information of the specific element can be stored. Of course, the system can also automatically analyze to obtain the specific elements of network resources.

For the above mentioned method for determining the subpage property, it refers to traversing through the document object model of the network resource to search the subpage property nodes, marking all subpage property nodes found, obtaining the subpage area matching the URL of the network resource, obtaining the URL pointed by the last link childnode of the subpage property nodes, and obtaining the subpage property matching the URL of the network resource. Still using the webpage as examples, FIG. 6 shows an exemplary process for determining the subpage property.

Figure 6:
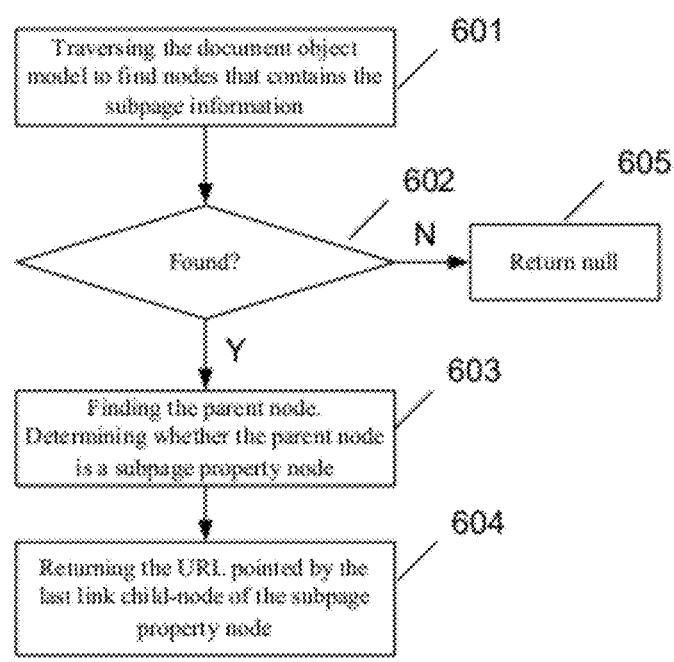
FIG. 6 illustrates exemplary an exemplary subpage operational process consistent with the disclosed embodiments.

As shown in FIG. 6, system 900 may traverse the document object model to find nodes that contains the subpage information (S601). There are many examples of nodes containing subpage information including, e.g., "previous page" "next page" "first page" "last page" "tail page" and integral links with contents less than 10000;

System 900 may also determine whether the nodes containing the subpage information can be found (S602). If yes, then the process continues to S603; otherwise the process goes to S605. In S603, system 900 finds the parent node, and in S605, system 900 returns null. If all child nodes of the parent node have subpage property, the parent node is a subpage property node. System 900 may return the URL pointed by the last link child-node of the subpage property node (S604).

Figure 7:
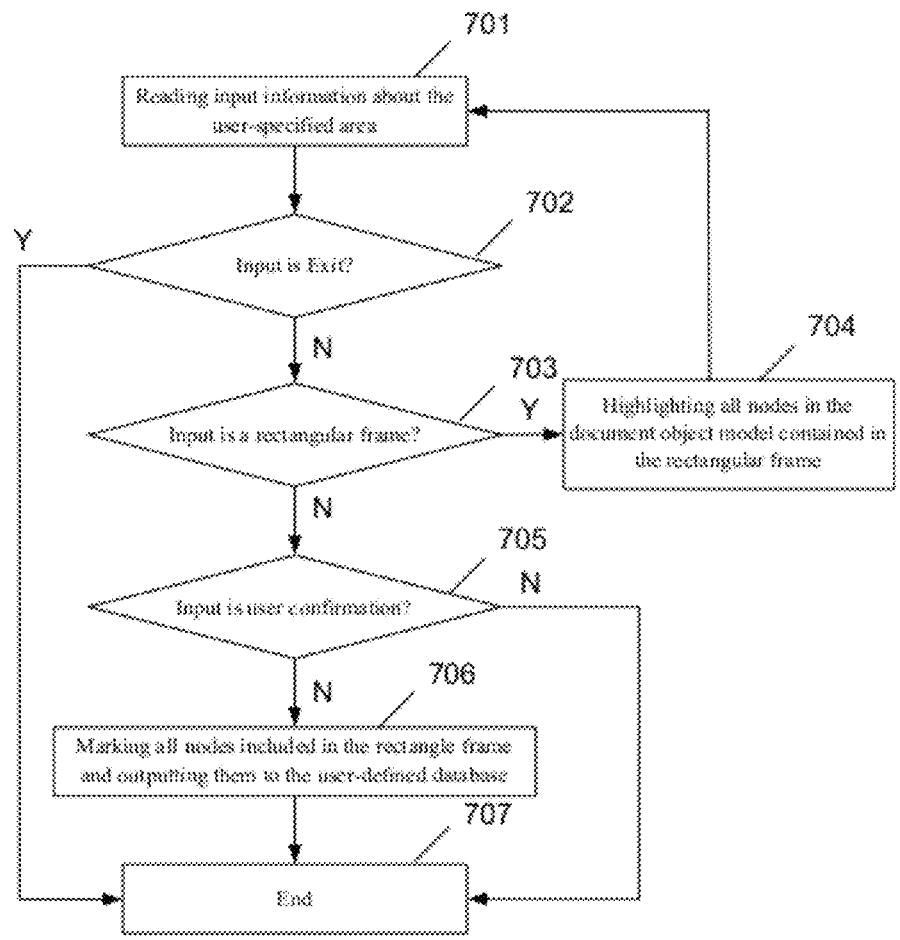
FIG. 7 illustrates an exemplary user-defined method consistent with the disclosed embodiments.

FIG. 7 shows an exemplary process for a user-defined method. As shown in FIG. 7, at beginning, system 900 may read input information about the user-specified area (S701), and determine whether the input is "Exit" (S702). If the input is Exit, the process goes to S707, which completes the process. Otherwise, system 900 may obtain coordinates of the area specified by the user, and the process continues to S703.

The user may specify areas using various ways. For example, the user can use the mouse to circulate the area of interest, and the system responds to the user input in loops until the user enters confirmation or exits.

System 900 may determine whether the input is a rectangular frame or any other specified shape (S703). If it is, the process continues to S704; otherwise the process goes to S705. In S704, system 900 highlights all nodes in the document object model contained in the rectangular frame or other specified shape or area, and the process goes to S701. In S705, system 900 determines whether the input is user confirmation. If it is, the process continues to S706; otherwise the process goes to S707.

The shape of the area circulated is not limited, such as rectangular, square, round, and oval, etc. For example, when the user circulates a rectangular frame, the system reads in the coordinates of the rectangle frame and traverse all nodes in the document object model to highlight the nodes within the rectangular frame for the user to confirm.

If the user confirms, system 900 may mark all nodes included in the rectangle frame and outputting them to the user-defined database. That is, the collection of these nodes is marked as the specific area and outputted as well as stored in the user-defined database. More particularly, system 900 may mark the coordinates in the document object model of the webpage, where all marked nodes form the specific area matching the URL of the webpage.

In addition, in order to increase the speed of later comparison and analysis, preferably, the specific contents of the webpage can also be processed through digital signature (i.e., creating a digital signature of the specific contents) and stored in the dynamic collection database.

Returning to FIG. 3, after capturing specific contents of the network resource (302), system 900 may compare the specific contents of two consecutive snapshots of the network resource (303).

More particularly, the specific contents of two consecutive snapshots of the network resource are compared based on the HTML source code of the network resource. Or the specific contents of two consecutive snapshots of the network resource are compared based on the corresponding document object model of the network resource.

Further, if there is any change in the specific contents of the network resource, system 900 may notify the user that the contents of the network resource have been updated (304). Alternatively or additionally, when there is any change in the specific contents of the network resource, system 900 may further determine whether a user-defined notification rule is satisfied, and the user is notified if the user-defined notification rule is satisfied.

The user-defined notification rule may include one or more of the followings: the total number of changed words in the specific contents exceeds a certain threshold value, the changed portion in the specific contents contains picture(s) (picture changes), the changed portion in the specific contents contains link(s) (link changes), the changed portion in the specific contents contains key word(s), and/or the changed portion in the specific contents contains multi-media file(s).

It should be noted that, if the user is notified of updates in the contents of the webpage after the user-defined notification rule is satisfied, when comparing and analyzing the specific contents of the network resource in step 303, the specific contents of the two consecutive snapshots of the network resource are compared directly to determine whether there is any change. However, if the user is notified with any update in the contents of the webpage without satisfying the user-defined notification rule, a faster comparison method may be used. That is, the digital signatures of the specific contents of the two consecutive snapshots of the network resource are compared directly to determine whether there is any change.

Further, optionally or additionally, system 900 may also receive a user instruction to read the network resource (305), and system 900 may make the display noticeable, such as highlighting, for the specific changed contents of the network resource according to the results of the comparison and analysis (306). Further, system 900 may display the processed contents of the network resource to the user (307).

More specifically, when highlighting the specific changed contents, in case of newly added contents, system 900 may make display noticeable for the added contents of the network resource; in case of all or part of contents being modified, system 900 may make display noticeable for the modified contents in the changed network resource (after the modification); and in case of removed contents, system 900 may make display noticeable for the removed contents of previous network resource (before the removal).

Figure 8:
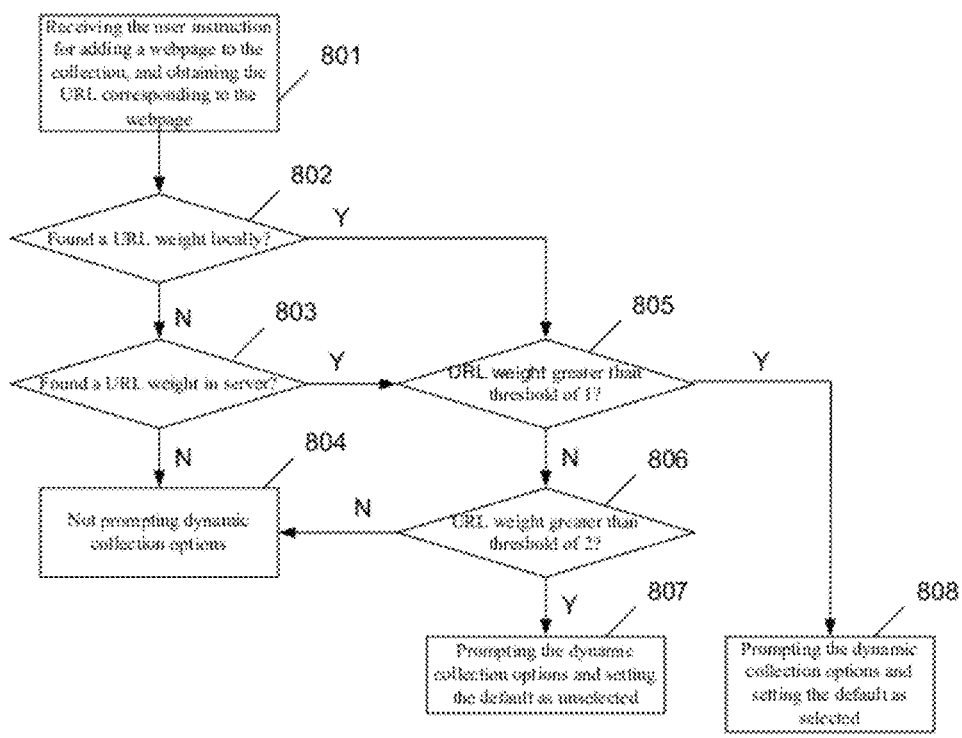
FIG. 8 illustrates an exemplary process for adding collection consistent with the disclosed embodiments.

In addition, the update notification system 900 may also enable the user to add the collection. FIG. 8 shows an exemplary process for the user to add collection, which may include obtaining the URL corresponding to the network resource by receiving a user instruction for adding the network resource to the collection; searching a URL weight matching the network resource; providing the user with a dynamic collection prompt based on the search results; determining whether to set the URL of the network resource as the link to the specified network resource based on the user's response to the dynamic collection prompt.

As shown in FIG. 8, system 900 may receive the user instruction for adding a webpage to the collection, and obtaining the URL corresponding to the webpage (S801). Further, system 900 may search the webpage attribute database at the client side to find a URL weight matching the URL of the webpage (S802). If the URL weight is found, the process goes to S805; otherwise the process continues to S803.

System 900 may also search the webpage attribute database at the server side to find the URL weight matching the URL of the webpage (S803). If the URL weight is found, the process goes to S805; otherwise the process continues to S804. In S804, system 900 does not prompt dynamic collection options;

Further, system 900 may determine whether the URL weight of the URL of the webpage is greater than a threshold value of one (1) (S805). If the URL weight is greater than one, the process goes to S808; otherwise the process continues to S806.

System 900 may also determine whether the URL weight of the URL of the webpage is greater than the threshold value of two (2) (S806). If the URL weight is greater than two, the process goes to S807; otherwise the process continues to S804. In S807, system 900 may prompt the dynamic collection options and setting the default as unselected; while in S808, system 900 may prompt the dynamic collection options and setting the default as selected.

The disclosed systems and methods enable dynamically monitoring a variety of network resources, including the ones not supporting RSS output, and notifying users after the relevant network resources are updated. Specifically, through the dynamic monitoring of network resources, the disclosed systems capture specific contents of the network resources and performs comparison and analysis to find out which network resources contain changed specific contents and to timely notify the users. This may overcome the limitation of the existing technology only able to subscribe web pages supporting RSS output, and the scope of application is broadened. Further, various ways for obtaining specific areas and specific elements are provided to achieve fast capture of specific contents. The specific contents of the network resources are compared and analyzed, the updated contents can be highlighted, and the details of specific changes in contents can be distinguished. That is, the update can be effectively distinguished as added information, removed information, or modified information, etc., which further facilitates conditions for the user to read the changed contents.

In addition, the disclosed systems and methods also provide a number of auxiliary functions to better meet various needs of users. For example, automatic detection function for latest changes in multiple web pages is also provided to effectively preserve all updates after the last reading by the user. The user is prompted and displayed when the user later opens the browser. Further, in addition to the default way, i.e., prompting the user as long as the specific contents of network resources changes, when the specific contents of the network resources change, the user can also use a user-defined way (i.e., a user-defined notification rule) to be prompted when the user-defined notification rule is satisfied. When the user adds a network resource to the collection, the importance of the network resource added to the collection by the user is automatically analyzed. Corresponding information is prompted to the user to help the user to determine whether to put the network resource into the category for being dynamically monitored and with updates being notified. Other applications and advantages are obvious to those skilled in the art.

What is claimed is:

1. An update notification method, comprising:
taking snapshots of a network resource;
capturing specific contents of the network resource through obtaining at least one of a specific area of the network resource and a specific element of the network resource, wherein the specific area of the network resource is determined based on areas of child nodes and a number of nodes similar to the child nodes in a document object model of the network resource; the areas of the child nodes are not greater than a first threshold, the similar nodes and the child nodes are placed in a group based on marking; a total of the areas of the child nodes and areas of the similar nodes in the group is greater than a second threshold; and the first threshold and the second threshold are not less than 0.5;
comparing specific contents of two consecutive snapshots of the network resource; and
if there is a change in the specific contents of the network resource, notifying a user that contents of the network resource have been updated.

2. The method according to claim 1, wherein comparing the specific contents further includes:
comparing the specific contents of two consecutive snapshots of the network resource based on HTML source code of the network resource.

3. The method according to claim 2, wherein comparing the specific contents further includes:
comparing the specific contents of two consecutive snapshots of the network resource based on a corresponding document object model of the network resource.

4. The method according to claim 3, wherein obtaining the specific area of the network resource includes:
determining whether there is a user-defined method;
when it is determined that there is a user-defined method, obtaining the specific area of the network resource through the user-defined method;
when it is determined that there is no user-defined method, searching a database to find a specific area matching a URL of the network resource;
determining whether the specific area matching the URL of the network resource can be found; and
when it is determined that the specific area matching the URL of the network resource cannot be found, obtaining the specific area of the network resource through a specific-area determination method.

5. The method according to claim 4, wherein, after the specific area of the network resource is obtained through the user-defined method or the specific-area determination method, the method further includes:
storing a matching relationship between the URL of the network resource and the specific area of network resource in the database.

6. The method according to claim 1, wherein the specific area of the network resource is determined based on areas of nodes and a number of similar nodes in the document object model of the network resource by:
setting a child node with an area greater than or equal to the preset threshold as a current node;
selecting child nodes with areas less than a preset threshold;
sorting selected child nodes of a current node based on area;
grouping the selected child nodes;
when there is a group containing child nodes whose number is greater than two and whose total area is greater than the preset threshold, marking all child nodes in the group;
when there is not a group containing child nodes whose number is greater than two and whose total area is greater than the preset threshold, traversing all child nodes according to areas of individual child nodes, from largest to smallest, and accumulating areas of the traversed child nodes;

when the accumulated areas of the traversed child nodes are greater than the preset threshold, marking all traversed child nodes; and outputting the marked child nodes as the specific area matching the URL of the network resource, wherein the preset threshold being not less than 0.5.

7. The method according to claim 4, wherein the user-defined method includes:

obtaining coordinates of an area specified by the user;

marking the coordinates in a document object model of the network resource; and forming the specific area matching the URL of the network resource with all marked nodes.

8. The method according to claim 1, wherein capturing the specific contents through obtaining the specific area of the network resource includes:

obtaining a subpage area of the network resource;

determining a subpage property of the network resource based on the subpage area; and capturing specific contents of all subpages.

9. The method according to claim 1, wherein capturing the specific contents through obtaining the specific element of the network resource includes:

obtaining coordinates of an element of the network resource as identified by the user;

marking the obtained coordinates in a document object model of the network resource; and finding the specific element of the network resource through node information in the marked document object model.

10. The method according to claim 1, wherein notifying the user that the contents of the network resource have been updated includes:

notifying the user that the contents of the network resource have been updated when a user-defined notification rule is satisfied, wherein the user-defined notification rule includes one or more conditions of:

a total number of changed words in the specific contents exceeds a certain threshold value;

a changed portion in the specific contents contains a picture;

the changed portion in the specific contents contains a link;

the changed portion in the specific contents contains a keyword; and the changed portion in the specific contents contains a multi-media file.

11. The method according to claim 1, further including:

receiving an instruction from the user to read the network resource;

highlighting a changed portion of the specific contents of the network resource according to results of comparison and analysis; and displaying the processed contents of the network resource to the user.

12. The method according to claim 1, further including:

receiving an instruction from the user to add the network resource to a collection;

searching a URL weight matching a URL of the network resource;

providing the user with a dynamic collection prompt based on the URL weight; and determining whether to set the URL of the network resource as the link to a captured network resource based on the user's response to the dynamic collection prompt.

13. An update notification system, comprising an update detection module and a user interface module, wherein:

the update detection module includes:

a snapshot unit configured to take snapshots of a network resource;

a capturing unit configured to capture specific contents of the network resource through obtaining at least one of a specific area of the network resource and a specific element of the network resource, wherein the specific area of the network resource is determined by a system automatic specific-area determination sub-unit based on areas of child nodes and a number of nodes similar to the child nodes in a document object model of the network resource; the areas of the child nodes are not greater than a first threshold, the similar nodes and the child nodes are placed in a group based on marking; a total of the areas of the child nodes and areas of the similar nodes in the group is greater than a second threshold; and the first threshold and the second threshold are not less than 0.5;

a comparison and analysis unit configured to compares specific contents of two consecutive snapshots of the network resource, and the user interface module includes:

a notification unit configured to notify a user of a change in contents of the network resource when the update detection module detects the change in the specific contents of the network resource.

14. The update notification system according to claim 13, wherein the comparison and analysis unit compares the specific contents of two consecutive snapshots of the network resource based on HTML source code of the network resource.

15. The update notification system according to claim 14, wherein the comparison and analysis unit compares the specific contents of two consecutive snapshots of the network resource based on a corresponding document object model of the network resource.

16. The update notification system according to claim 13, wherein the capturing unit includes:

a first obtaining sub-unit configured to obtain the specific area of the network resource through at least one of a specific-area determination method and a user-defined method.

17. The update notification system according to claim 16, wherein the first obtaining sub-unit includes a specific-area-obtaining-method determination sub-unit, and the specific-area-obtaining-method determination sub-unit is configured to:

determine whether there is a user-defined method;

if there is a user-defined method, instruct the first obtaining sub-unit to obtain the specific area of the network resource through the user-defined method; and if there is no user-defined method, instruct the first obtaining sub-unit to obtain the specific area of the network resource through the specific-area determination method.

18. The update notification system according to claim 16, wherein the first obtaining sub-unit includes a specific-area-obtaining-method determination sub-unit, and the specific-area-obtaining-method determination sub-unit is configured to:

determine whether there is a user-defined method;

if there is a user-defined method, instruct the first obtaining sub-unit to obtain the specific area of the network resource through the user-defined method;

if there is no user-defined method, instruct the first obtaining sub-unit to search a database to find a specific area matching a URL of the network resource; and if the specific area matching the URL of the network resource is not found, instruct the first obtaining sub-unit to obtain the specific area of the network resource through the specific-area determination method.

19. The update notification system according to claim 18, wherein, after obtaining the specific area of the network resource through the user-defined method and the specific-area determination method, the first obtaining sub-unit further is configured to store the matching relationship between the URL of the network resource and the specific area of network resource in the database.

20. The update notification system according to claim 13, wherein the system automatic specific-area determination sub-unit includes:

a selection sub-unit configured to sort selected child nodes of a current node based on area, to select child nodes with areas less than a preset threshold, and to set a child node with an area greater than or equal to the preset threshold as the current node to continue selecting satisfying child nodes;

a first marking sub-unit configured to group the selected child nodes based on tags and, if there is a group containing child nodes whose number is greater than two and whose total area is greater than the preset threshold, to mark all child nodes in the group;

a second marking sub-unit configured to traverse all child nodes according to areas of individual child nodes, from largest to smallest; to accumulate the areas of the traversed child nodes; and, when the accumulated areas of the traversed child nodes are greater than the preset threshold, to mark all traversed child-nodes; and a first output sub-unit configured to output the marked nodes to form the specific area matching the URL of the network resource, wherein the preset threshold being not less than 0.5.

21. The update notification system according to claim 18, wherein the first obtaining sub-unit includes:

a user-defined specific-area determination sub-unit configured to obtain coordinates of an area specified by the user, to mark the coordinates in a document object model of the network resource, and to form the specific area matching the URL of the network resource with all marked nodes.

22. The update notification system according to claim 16, wherein the capturing unit is used to obtain a subpage area of the network resource, the capturing unit includes the second obtaining sub-unit, and the second obtaining sub-unit is configured to obtain a subpage area of the network resource, to determine a subpage property of the network resource based on the subpage area, and to capture specific contents of all subpages.

23. The update notification system according to claim 16, wherein the capturing unit further including:

a third obtaining sub-unit configured to obtain coordinates of an element of the network resource as identified by the user, to mark the obtained coordinates in a document object model of the network resource, and to find the specific element of the network resource through node information in the marked document object model.

24. The update notification system according to claim 13, wherein the notification unit includes:

a determination sub-unit configured to determine whether a change in the specific contents satisfies a user-defined notification rule; wherein the user-defined notification rule includes one or more conditions of: a total number of changed words in the specific contents exceeds a certain threshold value, a changed portion in the specific contents contains a picture, the changed portion in the specific contents contains a link, the changed portion in the specific contents contains a keyword, and the changed portion in the specific contents contains a multi-media file; and a notification sub-unit configured to, when the user-defined notification rule is satisfied, notify the user that contents of the network resource have been updated.

25. The update notification system according to claim 13, further including a network resource processing module, wherein:

the user interface module further includes: a first receiving unit configured to receive an instruction from the user to read the network resource and to trigger the network resource processing module;

the network resource processing module is configured to highlight a changed portion of the specific contents of the network resource according to results of comparison and analysis; and the user interface module further includes: a display module configured display the processed contents of the network resource to the user.

26. The update notification system according to claim 13, further including a dynamic collection prompt module, wherein:

the user interface module further includes: a second receiving unit configured to receive an instruction from the user to add the network resource to a collection and to trigger the dynamic collection prompt module;

the dynamic collection prompt module includes:

a searching unit configured to search a URL weight matching a URL of the network resource;

a prompt unit configured to provide the user with a dynamic collection prompt based on the URL weight if the searching unit finds the URL weight matching the URL of the network resource; and a processing unit configured to determine whether to set the URL of the network resource as the link to a captured network resource based on the user's response to the dynamic collection prompt.

27. The update notification system according to claim 13, wherein the update notification system is a browser.

28. A non-transitory computer-readable storage medium including computer program code, when being executed by a computer unit, instructing the computer unit to:

take snapshots of a network resource;

capture specific contents of the network resource;

compare specific contents of two consecutive snapshots of the network resource through obtaining at least one of a specific area of the network resource and a specific element of the network resource, wherein the specific area of the network resource is determined based on areas of child nodes and a number of nodes similar to the child nodes in a document object model of the network resource; the areas of the child nodes are not greater than a first threshold, the similar nodes and the child nodes are placed in a group based on marking; a total of the areas of the child nodes and areas of the similar nodes in the group is greater than a second threshold; and the first threshold and the second threshold are not less than 0.5; and if there is a change in the specific contents of the network resource, notify a user that contents of the network resource have been updated.

* * * * *